United States Patent
McVicar (10) Patent No.: US 6,512,509 B1
(45) Date of Patent: Jan. 28, 2003

(54) FORKED GIMBAL ARM FORCE FEEDBACK MECHANISM

(75) Inventor: David McVicar, El Dorado, CA (US)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 09/541,439

(22) Filed: Mar. 31, 2000

Related U.S. Application Data (63) Continuation-in-part of application No. 09/273,894, filed on Mar. 22, 1999, and a continuation-in-part of application No. 09/507,394, filed on Feb. 18, 2000.

(51) Int. Cl.$^7$ .............................. G09G 5/00; G09G 5/08
(52) U.S. Cl. ....................................... 345/161; 345/156
(58) Field of Search ................................. 345/161, 156, 345/157, 158, 159, 163

(56) References Cited

U.S. PATENT DOCUMENTS

| | | | | |
|---|---|---|---|---|
| 5,436,640 A | * | 7/1995 | Reeves | 345/161 |
| 6,067,077 A | * | 5/2000 | Martin et al. | 345/161 |
| 6,154,201 A | * | 11/2000 | Levin et al. | 345/184 |
| 6,246,390 B1 | * | 6/2001 | Rosenberg | 345/156 |

\* cited by examiner

*Primary Examiner*—Vijay Shankar
(74) *Attorney, Agent, or Firm*—Townsend and Townsend and Crew LLP (57) ABSTRACT

A pointing device incorporates a force feedback mechanism driven by an actuator to convey physical sensations to the user. A position sensing apparatus is provided for monitoring the position of the user manipulable object in the pointing device. The sensing apparatus employs sensors that are directly or essentially directly connected to the user manipulable object to reduce backlash and are mounted in a way to eliminate off-axis loading on the sensors. The reduction of backlash produces more accurate position measurements, while the elimination of off-axis loading protects the sensors from damage to the internal mechanisms thereof. A computer controller processes the data from the sensors, and controls the actuator to produce feedback forces to the user manipulable object via the force feedback mechanism. The force feedback mechanism employs a gimbal mount having a pair of gimbal arms. One of the arms is a double sided or forked gimbal arm which substantially retains fully the joystick handle in all movements including applied torque about the axis of the handle as well as up-down and forward-backward forces. The improved constraint provides improved accuracy with reduced tolerances, resulting in better game play. The force feedback mechanism further includes a gear reduction system that utilizes an annular reduction gear portion for force transmission from the force feedback actuator to the user manipulable object. The annular reduction gear portion has gear teeth along an inner, concave side to produce a greater gear reduction, so that a smaller and cheaper actuator can be used. The gear reduction system is configured to take up less space. The pointing device is compact and accurate, and can be produced economically.

24 Claims, 8 Drawing Sheets

FORKED GIMBAL ARM FORCE FEEDBACK MECHANISM

CROSS-REFERENCES TO RELATED APPLICATIONS

This application is a continuation-in-part of U.S. patent application, Ser. No. 09/273,894, filed on Mar. 22, 1999, and U.S. patent application, Ser. No. 09/507,394 entitled "Folded Gear Drive Force Feedback Mechanism with Direct Drive Sensors", filed on Feb. 18, 2000, the entire disclosures of which are incorporated herein by reference.

BACKGROUND OF THE INVENTION

The present invention relates generally to pointing devices and, more particularly, to a pointing device having a force feedback mechanism including a gimbal mount that provides improved coupling with the user manipulable object to produce increased accuracy and improved game play.

One type of pointing devices incorporates a force feedback feature. Such devices are commonly used in an interactive system which typically displays a visual environment to a user on a display screen. The user can interact with the displayed environment to play a game through the use of a user manipulable object or user interface device, such as a joystick, joypad button controller, mouse, trackball, stylus and tablet, or the like. The interface device is connected to the computer system controlling the displayed environment. The computer updates the simulation or game in response to the user's manipulation of the user manipulable object, and provides feedback to the user. Some interface devices produce tactile or force feedback to the user by providing physical sensations to the user. Typically, motors or other actuators are coupled to the user manipulable object and are controlled by the computer system. Position sensors monitor the position of the user manipulable object and provide the measurement data to the computer system, which processes the data. Based on the data, the computer system generates control signals for controlling the motors to produce feedback forces to the user manipulable object, thereby conveying physical sensations in addition to visual stimulation to the user.

Pointing devices such as joystick devices tend to have extensive linkages that include, for example, gimbals or other mounting components. Position measuring sensors are typically placed remotely from the user manipulable object such as a joystick handle where the movement is occurring. As a result, tolerances between the linkage components (for instance, the various parts of the gimbals and mounting structure for the sensors) reduce the precision of the position measuring system. This in turn diminishes the quality of the game play.

SUMMARY OF THE INVENTION

The present invention is directed to a pointing device such as a joystick including an improved force feedback mechanism which has improved accuracy and provides better game play. The mechanism employs a pair of gimbal arms. One of the arms is a double sided or forked gimbal arm which provides a better coupling between the joystick and the force feedback mechanism to reduce backlash and provide improved game play.

The pointing device includes a position sensing apparatus for a user manipulable object such as a joystick. The position sensing apparatus desirably employs sensors that are directly or essentially directly connected to the user manipulable object to reduce backlash, and are mounted in a way to substantially eliminate off-axis loading on the sensors. The reduction of backlash produces more accurate position measurements to enhance game play, while the elimination of off-axis loading protects the sensors from damage to the internal mechanism thereof.

In some embodiments, the pointing device incorporates a force feedback mechanism which includes a gear reduction system that utilizes an annular reduction gear portion for force transmission from the force feedback actuator to the user manipulable object of the pointing device. The annular reduction gear portion produces a greater gear reduction than a conventional gear in a given space and hence a smaller actuator can be used. The gear reduction system is configured to take up less space. As a result, the pointing device is compact and accurate, and can be produced economically.

In accordance with an aspect of the present invention, a pointing device comprises a joystick and a first gimbal arm. The first gimbal arm includes a first arm portion and a second arm portion which are connected to the joystick to permit rotation between the joystick and the first gimbal arm around a first axis. The first and second arm portions are disposed on opposite sides of the joystick. A second gimbal arm is connected to the joystick to permit rotation between the joystick and the second gimbal arm around a second axis.

In some embodiments, the joystick includes a first circular protrusion and a second circular protrusion disposed on opposites sides of the joystick and oriented along the first axis. The first gimbal arm includes a first circular aperture in the first arm portion for receiving the first circular protrusion and a second circular aperture in the second arm portion for receiving the second circular protrusion.

In some embodiments, an actuator is coupled with the first gimbal arm for driving the first gimbal arm and the joystick in rotation around the second axis. A gear system is coupled between the actuator and the first gimbal arm, and provides a gear reduction from the actuator to the first gimbal arm. The gear system includes at least one annular gear portion which includes teeth on a concave side engaging teeth of a pinion for driving the annular gear portion.

In some embodiments, a first sensor has a first sensor body coupled with a first sensor shaft. The first sensor shaft is substantially immovably connected to the joystick to move with the joystick. The first sensor shaft is rotatable relative to the first sensor body generally around the first axis. A first mounting mechanism is provided on the first gimbal arm and is coupled to the first sensor body to permit the first sensor body to move with the first sensor shaft except in rotation around the first axis.

DESCRIPTION OF THE SPECIFIC EMBODIMENTS

The present invention is directed to a force feedback mechanism and a position sensing apparatus for a user manipulable object in a pointing device such as a joystick. The force feedback mechanism employs a double sided or forked gimbal arm which substantially retains fully the joystick handle in all movements including applied torque about the axis of the handle as well as up-down and forward-backward forces. The improved constraint provides increased accuracy with reduced tolerances, resulting in better game play. The force feedback mechanism further includes a gear reduction system that utilizes an annular gear portion which allows greater gear reduction. The gear reduction system is configured to take up less space, rendering the pointing device more compact. The position sensing apparatus employs sensors that are directly or essentially directly mounted onto the joystick shaft or other user manipulable object to reduce backlash and eliminate off-axis loading on the sensors.

Figure 1:
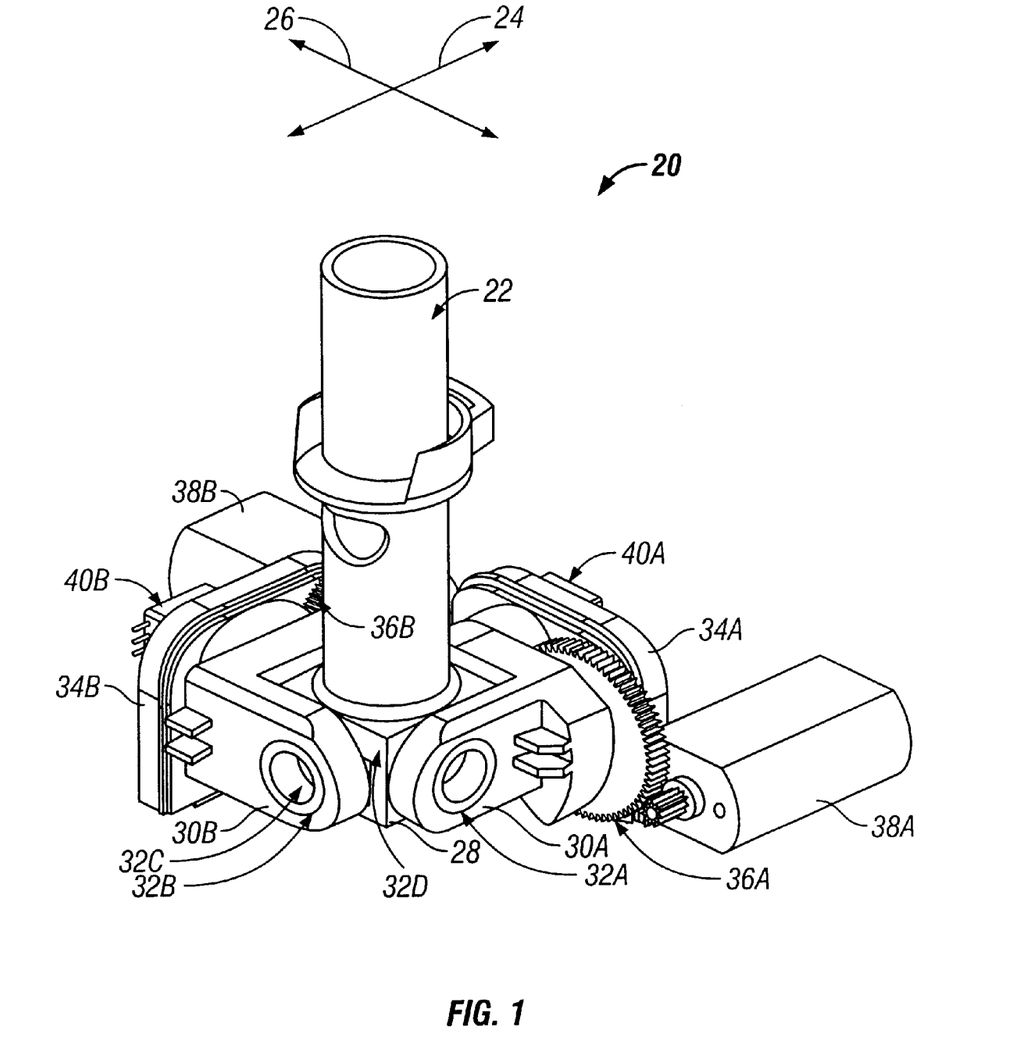
FIG. 1 is a perspective view of a prior joystick device having two single sided gimbal arms.

FIG. 1 shows a prior force feedback apparatus in a joystick device 20 for a joystick handle 22 supported on a gimbal mount to move in two degrees of freedom along the front-back axis 24 and left-right axis 26. The joystick handle 22 includes a base 28. A first gimbal arm 30A connects to the base 28 at a generally circular joint 32A. The joystick handle 22 includes a slot and pin feature in which a second rotation piece 32C is inserted. This rotation piece allows for spherical movement of the attachment point 32B, by moving in a plane perpendicular to the axis of the handle 22. A second gimbal arm 30B connects to the base 28 through the rotational piece 32C, providing a generally circular joint 32B. Another joint 32D is formed at the slot and pin feature of the joystick handle 22. The joint 32A permits relative rotation between the joystick handle 22 and the arm 30A caused by movement of the handle 22 along the front-back axis 24, while the joint 32B permits relative rotation between the joystick handle 22 and the arm 30B caused by movement of the handle 22 along the left-right axis 26.

The gimbal arms 30A, 30B shown are L-shaped. Each arm (30A or 30B) has one side having a joint (32A or 32B) connected with the base 28 of the joystick handle 22. The arms 30A, 30B are single sided arms.

The arm 30A is connected to a gear frame 34A, which supports a gear system 36A driven by a motor 38A. Likewise, the arm 30B is connected to a gear frame 34B, which supports a gear system 36B driven by a motor 38B. A potentiometer 40A is mounted to the gear frame 34A to sense left-right movement 26 of the joystick handle 22, which is transmitted to the potentiometer 40A through the arm 30A via the joint 32A. Another potentiometer 40B is mounted to the gear frame 34B to sense front-back movement 24 of the joystick handle 22, which is transmitted to the potentiometer 40B through the arm 30B via the joint 32B.

In the device 20 of FIG. 1, the left-right motion 26 of the joystick handle 22 causes the arm 30A to rotate and activate the potentiometer 40A which is mounted to the gear frame 34A. The front-back motion 24 causes the arm 30B to rotate and activate the potentiometer 40B which is mounted to the gear frame 34B. The tolerance in the joint 32A must first be taken up before the potentiometer 40A is activated in rotation by left-right motion 26 of the joystick handle 22. Likewise, the tolerance in the joints 32B and 32D must first be taken up before the potentiometer 40B is activated in rotation by front-back motion 24 of the joystick handle 22. These tolerances induce backlash in the pointing device 20, reducing measurement accuracy and diminishing the quality of the game play.

The use of two single sided gimbal arms 30A, 30B requires each gimbal arm to provide part of the retention for the handle 22. The partial retention results in extra tolerance stack-up and increased backlash in the system as compared to one that employs full retention. Moreover, because the potentiometers 40A, 40B are mounted to the gear frames 34A, 34B, the motors 38A, 38B are positioned outwardly to the side, resulting in a relatively large footprint, and thus a physically large joystick device 20.

Figure 2A:
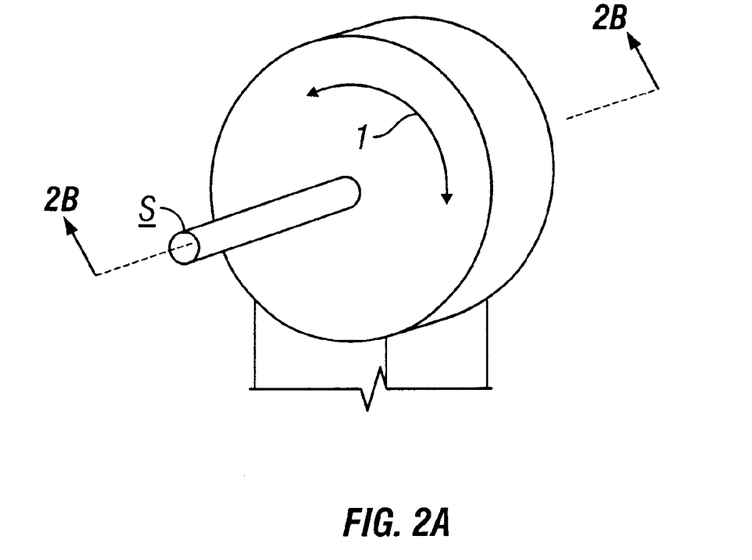
FIGS. 2A and 2B show a conventional variable resistor.

Another problem associated with the use of potentiometers or similar sensors in the joystick device 20 may be caused by off-axis loading. This is illustrated for an example of a typical potentiometer in FIGS. 2A and 2B. Rotation of the shaft S as indicated by arrow 1 changes the resistance of the potentiometer to provide position sensing. During game play, a game controller which is typically a computer controller such as a joystick must respond to a variety of sudden and unpredictable movements by the user along a variety of axes. This type of motion may transfer off-axis or radial loads to the sensors used in the game controller.

Figure 2B:
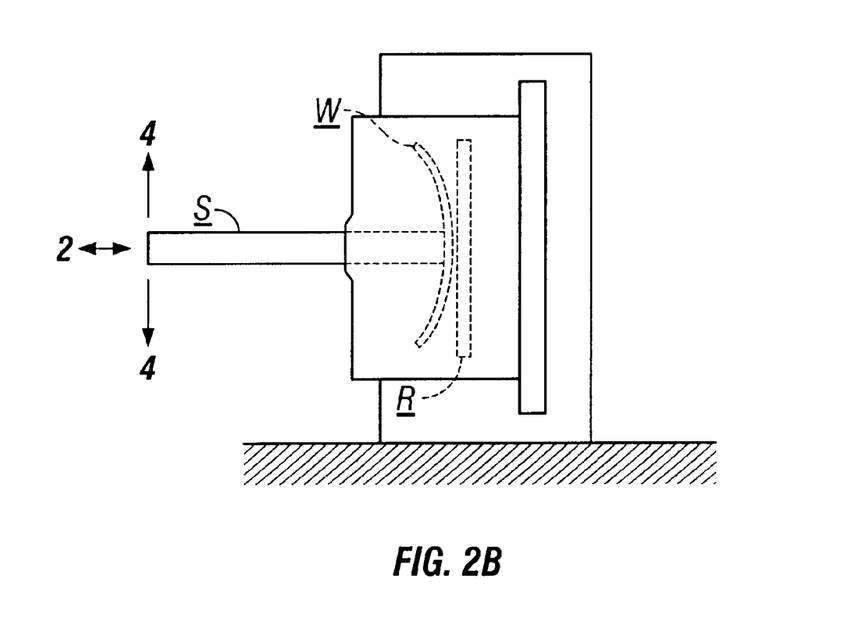

As shown in FIG. 2B, off-axis forces as indicated by arrows 2 and 4 may cause permanent deformation of the contact wiper W over time, bending the wiper W away from the resistive material R even when the shaft S of the variable resister is realigned. The variable resistor functions by having the wiper W swipe across the resistive material R to change resistance of the variable resistor based on the rotational position of the wiper W. The "lifting off" of the wiper W will eventually destroy the functionality of the variable resistor as the wiper W will no longer be in contact with the resistive material R. With the wiper W lifted away, movement of the shaft S is not registered by the variable resistor, and thus the computer does not register the hand or other motions of the user on the joystick or other game controller.

Conventional sensors do not have mechanisms for compensating or damping these loads on the sensors, and are unable to withstand large variations in radial loading and other off-axis forces distributed to the internal mechanisms of the variable resistor during vigorous game play. Furthermore, conventional potentiometers and variable resistors typically are rigidly mounted in the computer controllers, and end up transferring these loads to the internal mechanisms. As a result, these sensors lack both the robustness and accuracy over time to withstand the rigors of computer game play.

Figure 3:
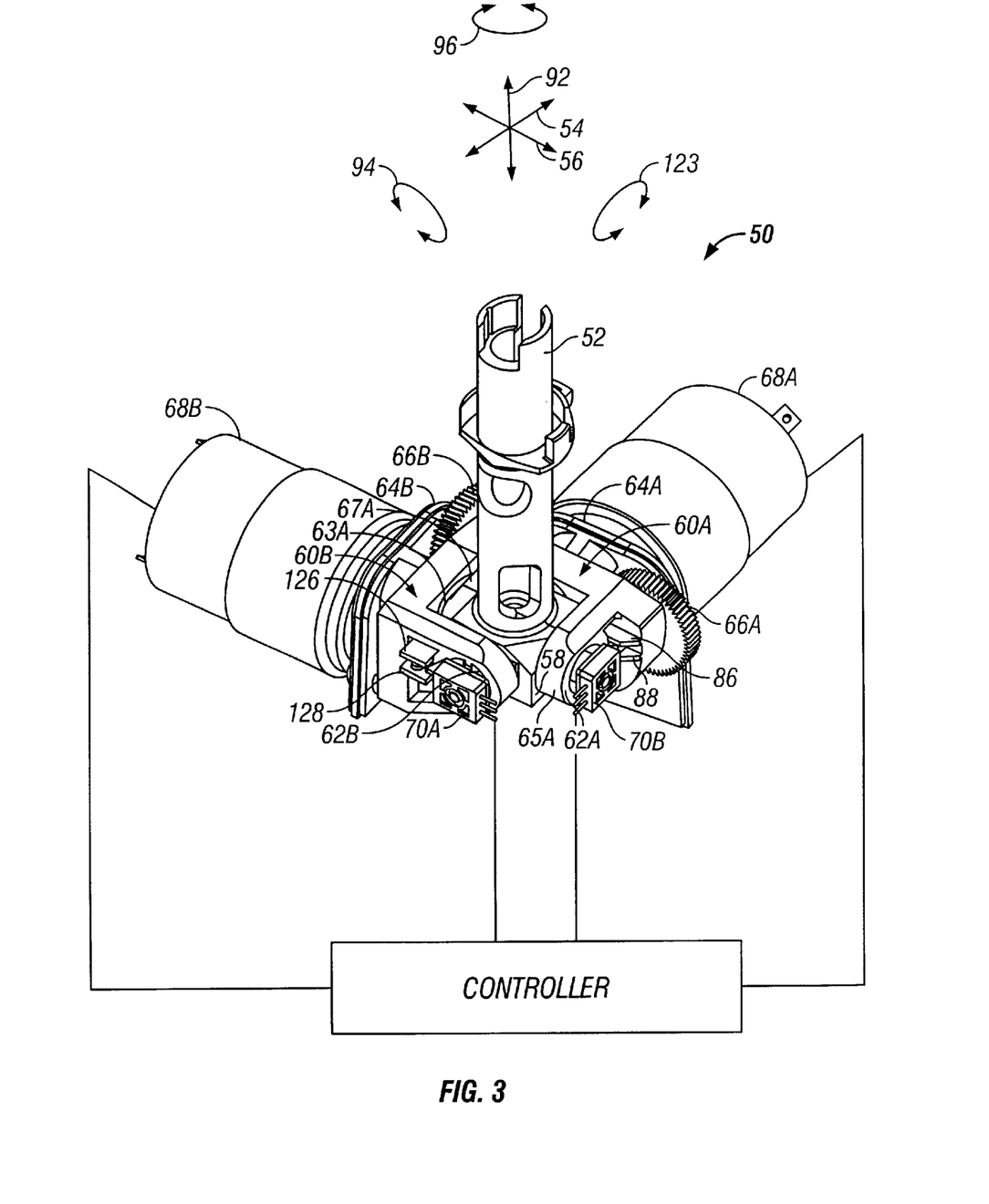
FIG. 3 is a perspective view of a joystick device according to an embodiment of the present invention.

An embodiment of a pointing device 50 which overcomes these problems is shown in FIG. 3. The pointing device 50 includes a joystick handle 52 supported on a gimbal mount to move in two degrees of freedom along the front-back axis 54 and left-right axis 56. A first gimbal arm 60A connects to the base 58 of the joystick handle 52 at a circular joint 62A and a circular joint 63A. A second gimbal arm 60B connects to the base 58 at a circular joint 62B. The left-right arm 60A is connected to a gear frame 64A, which supports a gear system 66A driven by a left-right motor 68A. The front-back arm 60B is connected to a gear frame 64B, which supports a gear system 66B driven by a front-back motor 68B.

A. Forked Gimbal Arm

Figure 4:
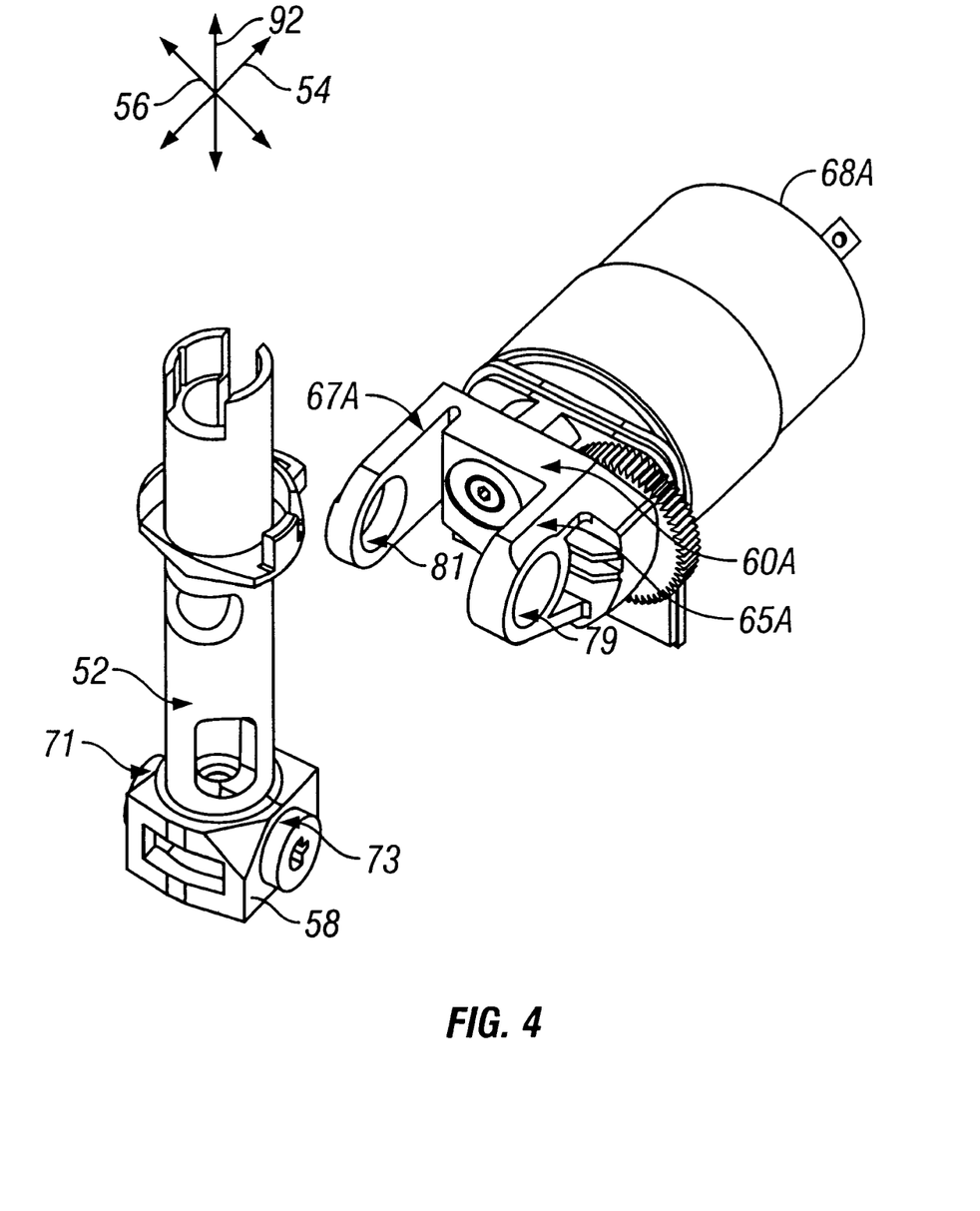
FIG. 4 is an exploded perspective view of the joystick device of FIG. 3 illustrating the forked gimbal arm.

As best seen in FIG. 4, the first gimbal arm 60A of the pointing device 50 is a double sided or forked gimbal arm including two parallel arm portions 65A, 67A having apertures 79, 81, respectively, for coupling with boss 73 and boss 71 at the base 58 of the joystick handle 52. The circular bosses 73, 71 are oriented along the left-right axis 56, and are desirably aligned with one another. Because the position of the handle 52 is controlled by two bosses 71, 73 on both sides instead of only one boss in a single sided gimbal arm, a higher torque resistance is produced. In addition, retaining the handle 52 in the forked gimbal arm 60A further reduces the effect of the tolerances between the apertures 79, 81 of the gimbal arm 60A and the bosses 73, 71 of the handle 52. A comparison between a single sided gimbal arm and a forked gimbal arm is illustrated in FIGS. 5A–6B.

Figure 5A:
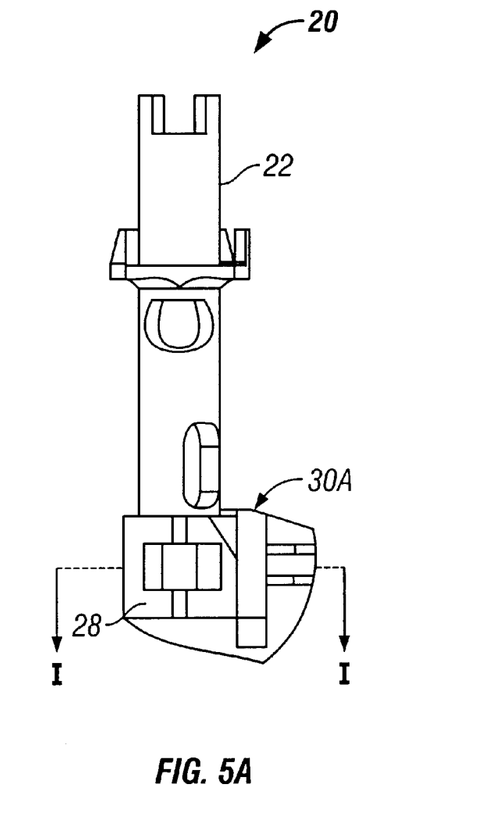
FIG. 5A is an elevational view of a joystick handle coupled to a single sided gimbal arm.
Figure 5B:
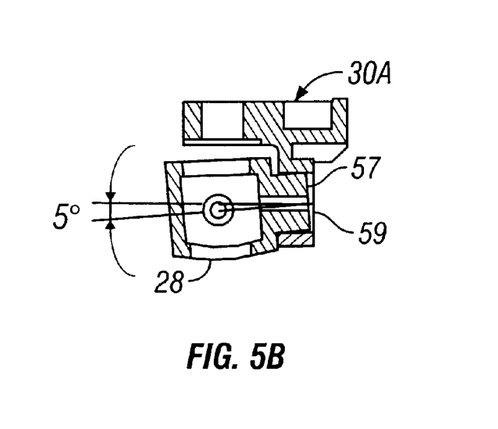
FIG. 5B is a cross-sectional view of the joystick handle and single sided gimbal arm of FIG. 5A along I—I.
Figure 6A:
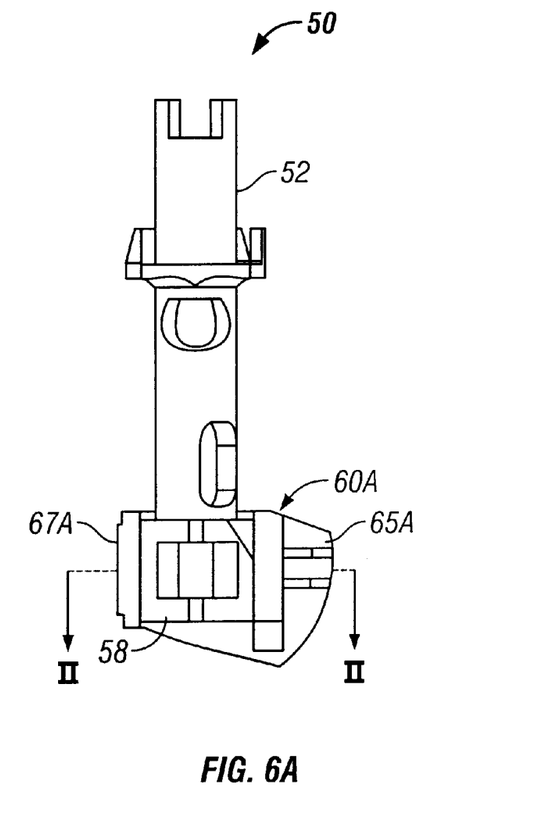
FIG. 6A is an elevational view of a joystick handle coupled to a forked gimbal arm.
Figure 6B:
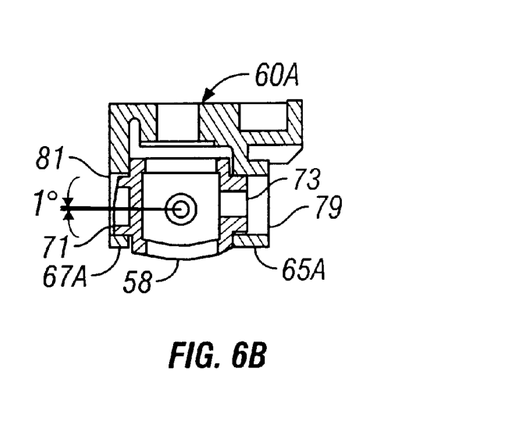
FIG. 6B is a cross-sectional view of the joystick handle and forked gimbal arm of FIG. 6A along II—II.

FIGS. 5A and 5B show the base 28 of the handle 22 having a protrusion 57 coupled to the opening 59 provided in the single sided gimbal arm 30A of the joystick device 20 of FIG. 1. The tolerance between the protrusion 57 and the opening 59 permits some backlash. The amount of backlash in the form of angular displacement at the connection between the handle 22 and the gimbal arm 30A is, for example, 5°. In FIGS. 6A and 6B, the base 58 of the handle 52 is connected with the forked gimbal arm 60A at two locations. The protrusion 73 is coupled to the aperture 79 provided in the arm portion 65A on one side, and the protrusion 71 is coupled to the opening 81 provided in the arm portion 67A on the opposite side. For the same tolerance between the protrusions 73, 71 and the apertures 79, 81 in the forked gimbal arm 60A as in the single sided arm 30A, the backlash between the handle 52 and the gimbal arm 60A is reduced to, for example, 10. Therefore, the joystick device 50 having the forked gimbal arm 60A can be manufactured at lower tolerances than the prior joystick device 20, and still produces less backlash.

Another feature of the forked gimbal arm 60A is the restriction of axial movement between the handle 52 and the gimbal arm 60A along the axis of the protrusions 71, 73 and apertures 79, 81. To provide the same level of restriction, a single sided gimbal arm needs to rely on tighter total system assembly tolerances, thereby increasing production cost and reducing system function.

B. Direct Drive Sensors

In the pointing device 50 of FIG. 3, a rotational sensor such as a left-right potentiometer 70A is connected substantially directly to the base 58 of the joystick shaft 52 to sense left-right movement 56 of the joystick handle 22. Another rotational sensor 70B is a front-back potentiometer which is directly connected to the base 58 to sense front-back movement 24 of the joystick handle 22.

Figure 7:
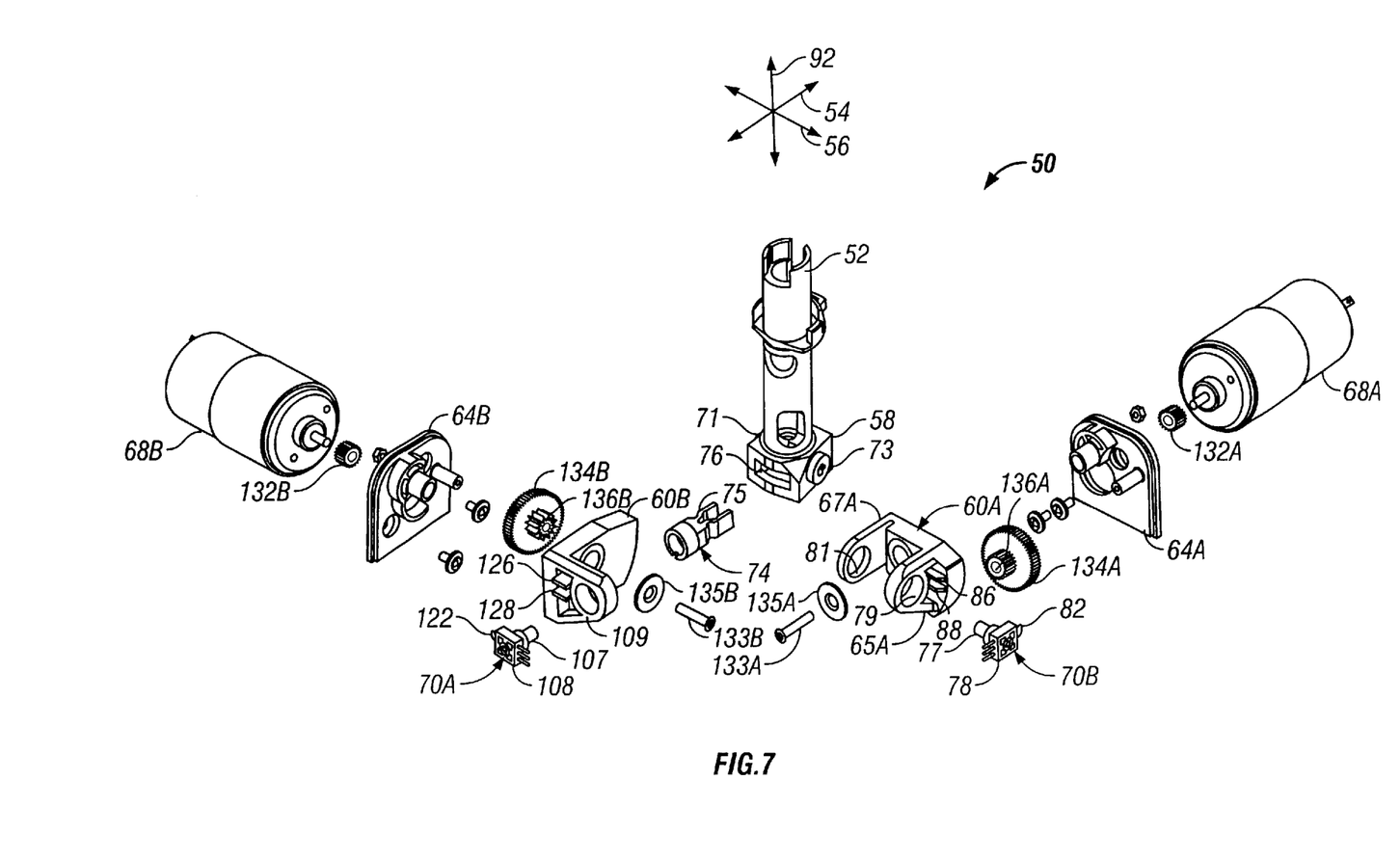
FIG. 7 is an exploded view of the joystick device of FIG. 3.

As shown in the exploded view of FIG. 7, the joystick handle 52 includes two bosses 73, 71 which extend in opposite directions from the base 58 and which are desirably integrally formed with the handle 52. The circular bosses 73, 71 are oriented generally along the left-right axis 56, and are desirably aligned with one another. Another circular boss 74 includes a protrusion or plug 75 which is inserted into a slot 76 provided in the base 58 of the joystick handle 52. The boss 74 is generally oriented along the front-back axis 54. The plug 75 is desirably press fitted into the slot 76, and is constrained from moving up or down or rotating around the front-back axis 54 with respect to the handle 52. This creates a coupling of the boss 74 to the handle 52. The plug 75 is advantageously configured to permit movement of the boss 74 in small rotation around the axis of the handle 52 to track spherical movement of the joystick gimbal mechanism.

The sensor 70B has a sensor shaft 77 extending from a sensor body 78 and being configured to be inserted into an opening in the boss 73. The axis of the sensor shaft 77 is generally aligned with the left-right axis 56. The aperture 79 in the arm portion 65A of the arm 60 allows the connection between the boss 73 and the sensor shaft 77 to be made therethrough. The sensor shaft 77 is desirably connected to the boss 73 via a press fit or an interference fit to form a direct drive connection to remove backlash and improve sensor accuracy. As shown in FIG. 3, the insertion of the boss 73 through the aperture 79 forms the gimbal joint 62A between the joystick handle 52 and the arm 60A. On the opposite side, the insertion of the boss 71 through the aperture 81 forms the gimbal joint 63A between the joystick handle 52 and the arm 60A.

Figure 8A:
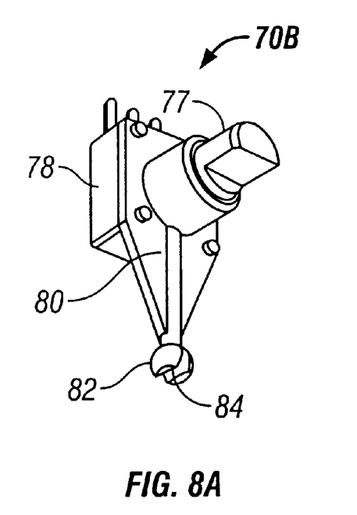
FIG. 8A is a perspective view of a position sensor according to an embodiment of the invention.

As best seen in FIG. 8A, the front-back sensor 70B includes a lateral protrusion 80 extending generally radially from the sensor body 78 away from the axis of the sensor shaft 77. At the end of the lateral protrusion 80 is a distal end 82, which is desirably spherical. The distal end 82 desirably includes a slot or slit 84. When assembled, the distal end 82 is disposed between a pair of contact ribs or surfaces 86, 88 provided on the arm 60A, as shown in FIG. 3. The contact surfaces 86, 88 may be disposed generally radially from the axis of the sensor shaft 77, or they may be disposed laterally from the axis of the sensor shaft 77 and positioned generally parallel to one another, as shown in FIGS. 3 and 7.

The contact surfaces 86, 88 contact the distal end 82 to prevent rotation of the sensor body 78 relative to the axis of the sensor shaft 77. The generally spherical distal end 82 provides substantial freedom in other degrees of movement that are unconstrained. For example, except for rotation relative to the axis of the sensor shaft 77, the sensor body 78 moves with the joystick shaft 52 in five degrees of freedom that include front-back 54, left-right 56, up-down 92, row 94 relative to the front-back axis 54, and yaw 96 relative to the up-down axis 92, as shown in FIG. 3. By allowing the sensor body 78 to move with the joystick shaft 52 in the five degrees of freedom, the mounting mechanism for the sensor 70B does not induce any bending forces between the sensor shaft 77 and the sensor body 78. Because the torque for rotating the sensor shaft 77 relative to the sensor body 78 is very low, the force on the lateral protrusion 80 is very low and no damage will occur. In this way, the only forces that the internal mechanisms of the sensor 70B experiences are those that rotate the wiper W coupled to the shaft 77 in the sensor 70B. As a result, the mounting mechanism for the sensor 70B substantially eliminates off-axis forces (i.e., forces other than rotation about the axis of the sensor shaft 77) from causing strain in the internal mechanisms of the sensor 70B, thereby facilitating improvement in sensor performance by eliminating backlash without causing damage to the sensor 70B.

The slot 84 in the distal end 82 of the sensor 70B shown in FIG. 8A is generally parallel to the contact surfaces 86, 88, and typically extends through the distal end 82. The slot 84 allows for variance in the manufacturing tolerances of the distal end 82 while ensuring ease of assembly between the contact surfaces 86, 88. The slot 84 advantageously allows the distal end 82 to be slightly compressed to provide a snug fit between the contact surfaces 86, 88. For example, the generally spherical distal end 82 may have a diameter of about 3.15 mm while the gap between the contact surfaces 86, 88 has a size of about 3 mm. Typically, the distal end 82 has a diameter between about 2 and about 4 mm. The protrusion 80 has a total length of between about 3 mm and about 20 mm, typically about 14 mm.

The distal end 82 is typically made of a plastic or polymer material which provides for a certain level of flexibility and resiliency. The contact surfaces 86, 88 desirably contact the distal end 82 at two contact points with an interference fit that prevents the sensor body 78 from rotating relative to the axis of the sensor shaft 77 while providing substantially unconstrained movement in the remaining five degrees of freedom. As plastics and hard polymers tend to creep, eventually the stress created by the interference fit may reach a point on the stress curve of the material where the creeping stops, but there desirably will still be no clearance between the contact surfaces 86, 88 and the distal end 82 to ensure a snug fit therebetween. In some embodiments, the slot 84 in the distal end 82 may include a bias member such as a spring or compressible material that biases the distal end 82 to maintain contact with the contact surfaces 86, 88.

As shown in FIG. 7, the left-right sensor 70A includes a sensor shaft 107 extending from a sensor body 108 and being configured to be inserted into an opening in the boss 74. The axis of the sensor shaft 107 is generally aligned with the front-back axis 54. The arm 60B has an aperture 109 which allows the connection between the boss 74 and the sensor shaft 107 to be made therethrough. As shown in FIG. 3, the insertion of the boss 74 through the aperture 109 forms the gimbal joint 62B between the joystick handle 52 and the arm 60B.

The sensor shaft 107 is desirably connected to the boss 74 via a press fit or an interference fit to form a direct drive connection to substantially remove backlash and improve sensor accuracy. Because the boss 74 may move slightly in rotation around the axis of the joystick handle 52, the sensor 70A is a floating sensor. There may be some backlash at the connection between the plug 75 of the boss 74 and the slot 76 of the handle base 58, but the total amount of backlash is substantially reduced as compared with the prior joystick device 20 of FIG. 1.

Figure 8B:
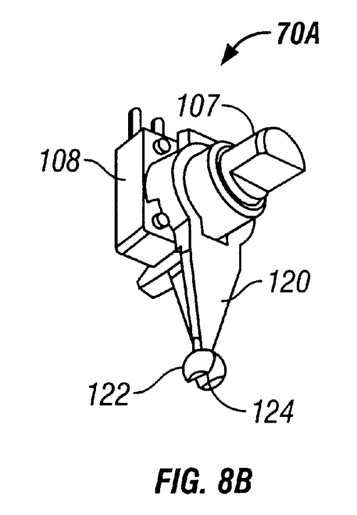
FIG. 8B is a perspective view of a position sensor according to another embodiment of the invention.

The left-right sensor 70A may be identical to the front-back sensor 70B shown in FIG. 8A. FIG. 8B shows an alternate embodiment for the sensor 70A which includes a lateral protrusion 120 extending generally radially from the sensor body 108 away from the axis of the sensor shaft 107. At the end of the lateral protrusion 120 is a distal end 122 which typically is generally spherical. The distal end 122 desirably includes a slot or slit 124. In the alternate embodiment of FIG. 8B, the lateral protrusion 120 is a separate element that is attached to the sensor body 108, while the lateral protrusion 80 in the embodiment of FIG. 8A is integrally formed with the sensor body 78. The lateral protrusion 120 in this embodiment may be replaced to adapt the sensor 70A to different sizes and configurations as desired. Of course, both sensors 70A, 70B may have the same structure shown in FIG. 8B.

When assembled, the distal end 122 of the sensor 70A is disposed between a pair of contact ribs or surfaces 126, 128 provided on the arm 60B, as shown in FIG. 3. The contact surfaces 126, 128 may be disposed generally radially from the axis of the sensor shaft 107, or they may be disposed laterally from the axis of the sensor shaft 107 and positioned generally parallel to one another, as shown in FIGS. 3 and 7.

The contact surfaces 126, 128 contact the distal end 122 to prevent rotation of the sensor body 108 relative to the axis of the sensor shaft 107. The generally spherical distal end 122 provides substantial freedom in other degrees of movement that are unconstrained. For example, except for rotation relative to the axis of the sensor shaft 107, the sensor body 108 moves with the joystick shaft 52 in five degrees of freedom that include front-back 54, left-right 56, up-down 92, yaw 96 relative to the up-down axis 92, and pitch 123 relative to the left-right axis 56, as shown in FIG. 3. By allowing the sensor body 108 to move with the joystick shaft 52 in the five degrees of freedom, the mounting mechanism for the sensor 70A does not induce any bending forces between the sensor shaft 107 and the sensor body 108, thereby substantially eliminating off-axis forces (i.e., forces other than rotation about the axis of the sensor shaft 107) from causing strain in the internal mechanisms of the sensor 70A. The size, material, and operation of the sensor 70A are substantially the same as those described above for the sensor 70B.

Figure 9:
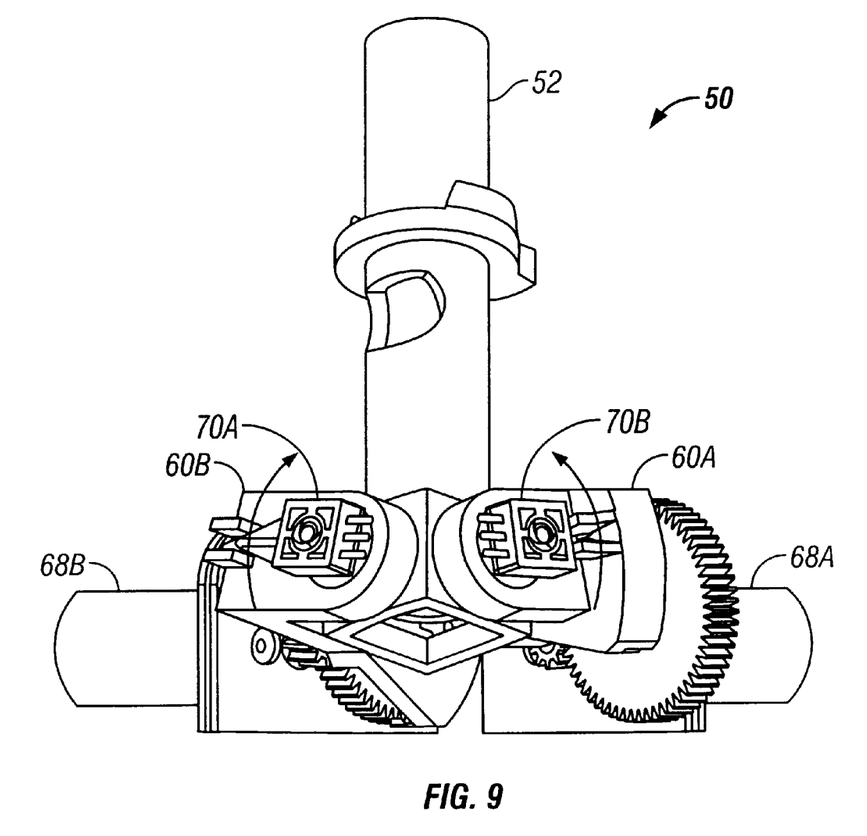
FIG. 9 is a perspective view illustrating diagonal movement of the joystick device of FIG. 3.

The direct drive connections for coupling the sensors 70A, 70B to the joystick handle 52 cause the sensors 70A, 70B to move with the handle 52 which is supported on a gimbal mount. FIG. 9 illustrates movement of the sensors 70A, 70B when the handle 52 is moved diagonally in an off-axis manner between the front-back axis 54 and the left-right axis 56. Because the sensors 70A, 70B move with the handle 52 except for the constraints against rotation around the axes of their respective sensor shafts 77, 107, off-axis forces are substantially eliminated.

C. Gear Reduction System

Referring again to FIG. 3, the gear systems 66A, 66B provide gear reduction between the respective motors 68A, 68B and the joystick handle 52. The higher the reduction ratio, the smaller and cheaper the motors 68A, 68B that may be used. Large reductions typically require large gears, however, which would increase the size of the joystick device 50. Alternatively, large reductions may be achieved by using multiple gear reductions, but that would lead to an increase in backlash. An embodiment of the present invention employs a double reduction annular gear drive for the gear systems 66A, 66B to achieve high gear reduction while reducing the physical size of the joystick device 50 as compared to conventional devices.

As best seen in FIG. 7, each motor 68A, 68B drives a first pinion 132A, 132B, which is configured to engage the first gear 134A, 134B and form a first reduction for driving it in rotation in an opposite direction from the rotation of the first pinion 132A, 132B. A second pinion 136A, 136B is attached to the first gear 134A, 134B, and rotates with the first gear 134A, 134B. The second pinion 136A, 136B in turn drives a second gear attached to the gimbal arm 60A, 60B to provide a second gear reduction.

Figure 10:
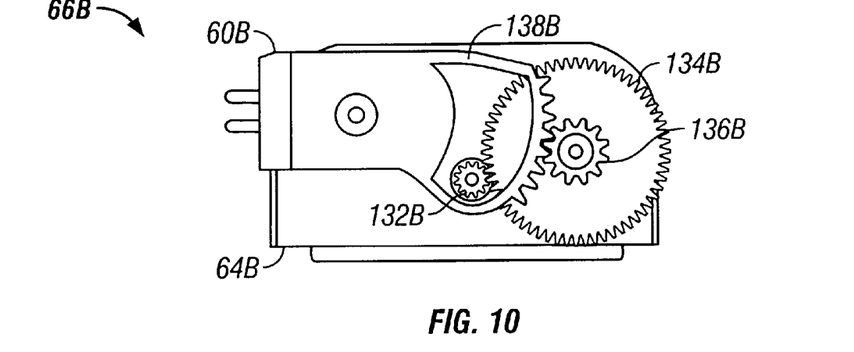
FIG. 10 is an elevational view of a gear reduction system using a standard outside gear section according to an embodiment of the invention.

FIG. 10 shows an embodiment of a second reduction gear portion 138B in the gear system 66B which is engaged and driven by the second pinion 136B to rotate in the same direction as the first pinion 132B. The second gear portion 138B desirably is integrally formed with the arm 60B to reduce the number of parts and potential backlash. Alternatively, the second gear portion 138B may be detachable and replaceable to provide different gear reductions as desired. The arm 60B provides gimbal support for the joystick handle 52 and forms part of the gear system 66B. The arm 60B is connected to the gear frame 64B by the fastener 133B and washer 135B (see FIG. 7). Similarly, the arm 60A is connected to the gear frame 64A by the fastener 133A and washer 135A (see FIG. 7).

The second gear portion 138B has a sufficient size to provide the full range of rotational movement of the arm 60B for providing force feedback drive to the joystick handle 52. In this way, the gear system 66B does not require a full second gear, thereby reducing the size of the device 50. Because the front-back sensor 70B is moved from the gear frame 64B to the other side of the joystick handle 52, the front-back motor 68B may be moved closer to the handle 52 as compared to the prior device of FIG. 1, thereby reducing the size of the present device 50.

Figure 11:
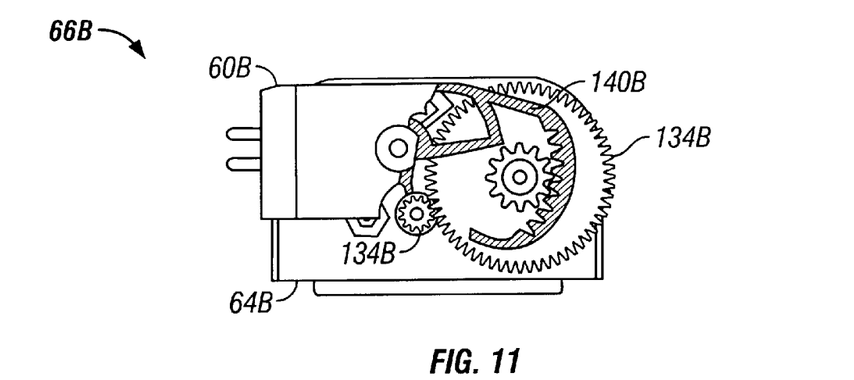
FIG. 11 is a partial sectional view of a gear reduction system using an annular gear section according to another embodiment of the invention.
Figure 12:
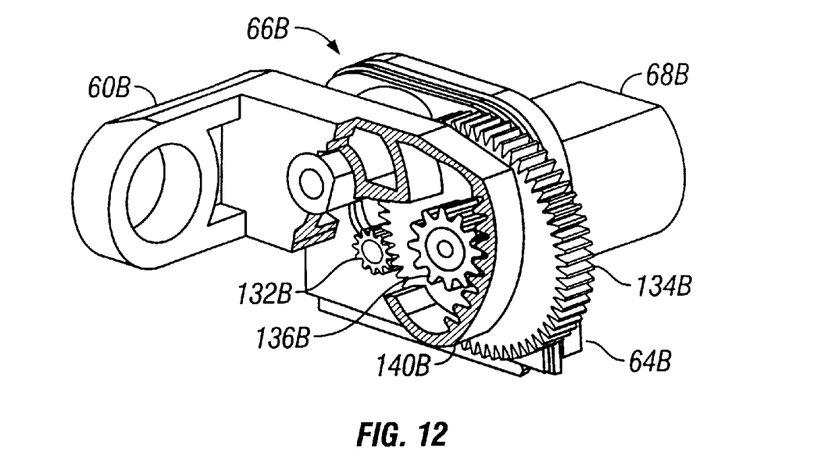
FIG. 12 is a perspective view of the gear reduction system of FIG. 11.

In another embodiment of the gear system 66B shown in FIGS. 11 and 12, the second reduction gear portion 140B is an annular gear portion having gear teeth on the inner, concave surface instead of the outer, convex surface as in the embodiment of FIG. 10. In FIGS. 11 and 12, the second reduction gear portion 140B is folded over the first reduction formed by the first pinion 132B and the first reduction gear 134B. The second pinion 136B drives the second reduction gear portion 140B to rotate in a direction opposite from the direction of the rotation of the first pinion 132B. Placing the gear teeth on the concave side of the annular gear portion 140B moves the pitch diameter to the other side of the second pinion 136B, thereby reducing the size for a given gear ratio. The use of the folded gear portion 140B in FIGS. 11 and 12 results in a more compact device than the use of the reduction gear portion 138B of FIG. 10.

The gear system 66A may be substantially identical to the gear system 66B illustrated in FIGS. 10–12. The present gear systems 66A, 66B preferably provide a gear reduction ratio of at least about 15:1, more preferably between about 17:1 to about 35:1.

In operation, the user manipulates the joystick handle 52. The position sensors 70A, 70B sense the position of the handle 52, and feed the position measurement data to a motor controller 150, as shown in FIG. 3. The controller 150 processes the data and directs control signals to the motors 68A, 68B to generate and apply feedback forces to the joystick handle 52 via the gear systems 66A, 66B and the gimbal arms 60A, 60B, thereby conveying physical sensations to the user.

The forked gimbal arm 60A creates a small but strong mechanism capable of higher accuracy and lower tolerances than a single sided gimbal arm, and produces improved game play at lower manufacturing costs. The direct drive connections for mounting the sensors 70A, 70B produce accurate position measurement by reducing backlash while minimizing off-axis loading of the sensors 70A, 70B. The folded gear reduction systems 66A, 66B create greater gear reduction to minimize the size of the motors 68A, 68B while reducing the size of the joystick device 50.

The above-described arrangements of apparatus and methods are merely illustrative of applications of the principles of this invention and many other embodiments and modifications may be made without departing from the spirit and scope of the invention as defined in the claims. For instance, the joystick handle may be replaced by another user manipulable object having a different type of movement in different degrees of freedom. Other types of sensors or variable resistors may be used for position sensing. A different gimbal mount structure may be used. The number of gear reductions may be greater than or smaller than two.

Different types of actuators can be used for generating force feedback. The scope of the invention should, therefore, be determined not with reference to the above description, but instead should be determined with reference to the appended claims along with their full scope of equivalents.

What is claimed is:

1. A pointing device comprising:
   a joystick;
   a first gimbal arm including a first arm portion and a second arm portion which are connected to the joystick to permit rotation between the joystick and the first gimbal arm around a first axis, the first and second arm portions being disposed on opposite sides of the joystick; and
   a second gimbal arm being connected to the joystick to permit rotation between the joystick and the second gimbal arm around a second axis,
   wherein the joystick includes a first circular protrusion and a second circular protrusion disposed on opposites sides of the joystick and oriented along the first axis, and wherein the first gimbal arm includes a first circular aperture in the first arm portion for rotatably receiving the first circular protrusion and a second circular aperture in the second arm portion for rotatably receiving the second circular protrusion.

2. The pointing device of claim 1 wherein the second axis is perpendicular to the first axis.

3. The pointing device of claim 1 wherein the third circular protrusion is removably connected to a shaft of the joystick.

4. The pointing device of claim 1 wherein the first circular protrusion and second circular protrusion are aligned along a common axis.

5. The pointing device of claim 1 wherein the first arm portion and second arm portion of the first gimbal arm are connected to opposite sides of the joystick to substantially prevent movement between the joystick and the first gimbal arm along the first axis.

6. The pointing device of claim 1 wherein the joystick includes a third circular protrusion oriented along the second axis, and wherein the second gimbal arm includes a circular aperture for rotatably receiving the third circular protrusion.

7. A pointing device comprising:
   a user manipulable object;
   a gimbal arm including a first arm portion and a second arm portion which are connected to the user manipulable object to permit rotation between the user manipulable object and the gimbal arm around a first axis, the first and second arm portions being disposed on opposite sides of the user manipulable object;
   an actuator coupled with the gimbal arm for driving the gimbal arm and the user manipulable object in rotation around a second axis; and
   a gear system coupled between the actuator and the gimbal arm, the gear system providing a gear reduction from the actuator to the gimbal arm, the gear system including at least one annular gear portion which includes teeth on a concave side engaging teeth of a pinion for driving the annular gear portion.

8. The pointing device of claim 7 wherein the second axis is perpendicular to the first axis.

9. The pointing device of claim 7 wherein the gear system comprises a double reduction gear system.

10. The pointing device of claim 9 wherein the gear system comprises:
    a drive pinion connected to the actuator to be driven by the actuator in rotation;

a gear coupled to the drive pinion to be driven by the drive pinion; and an intermediate pinion connected to the gear to move with the gear, wherein the gimbal arm includes an annular gear portion having teeth on a concave side engaging teeth of the intermediate pinion for driving the user manipulable object in rotation around the second axis.

11. The pointing device of claim 7 further comprising a rotational sensor directly connected to the user manipulable object for sensing rotation of the user manipulable object with respect to the second axis.

12. The pointing device of claim 11 wherein the rotational sensor comprises a sensor body coupled with a sensor shaft which is rotatable relative to the sensor body around the second axis, the sensor shaft being substantially immovably connected to the user manipulable object to move with the user manipulable object, and further comprising a mounting mechanism coupled with the rotational sensor to permit movement of the sensor body with the sensor shaft except in rotation with respect to the second axis.

13. The pointing device of claim 12 wherein the sensor body includes a protrusion, and wherein the mounting mechanism comprises a pair of surfaces provided on the gimbal arm and being disposed generally laterally relative to the second axis and contacting two sides of the protrusion to prevent rotation of the sensor body around the second axis.

14. The pointing device of claim 13 wherein the protrusion of the sensor body includes a generally spherical distal end and the pair of surfaces contact the generally spherical distal end to permit movement of the sensor body with the sensor shaft except rotation of the sensor body around the second axis.

15. A pointing device comprising:

a joystick;

a first gimbal arm including a first arm portion and a second arm portion which are connected to the joystick to permit rotation between the joystick and the first gimbal arm around a first axis, the first and second arm portions being disposed on opposite sides of the joystick;

a first sensor having a first sensor body coupled with a first sensor shaft, the first sensor shaft being substantially immovably connected to the joystick to move with the joystick, the first sensor shaft being rotatable relative to the first sensor body generally around the first axis; and a first mounting mechanism provided on the first gimbal arm and being coupled to the first sensor body to permit the first sensor body to move with the first sensor shaft except in rotation around the first axis.

16. The pointing device of claim 15 wherein the first sensor shaft is inserted into an opening in the joystick with a press fit and is oriented generally along the first axis.

17. The pointing device of claim 15 wherein the first sensor includes a first protrusion connected to the first sensor body, and wherein the first mounting mechanism comprises a pair of surfaces provided on the first gimbal arm and being disposed generally laterally relative to the first axis and contacting two sides of the first protrusion to prevent rotation of the first sensor body around the first axis.

18. The pointing device of claim 17 wherein the first protrusion of the first sensor body includes a generally spherical distal end and the pair of surfaces contact the generally spherical distal end to permit movement of the first sensor body with the joystick except rotation of the first sensor body around the first axis.

19. The pointing device of claim 17 further comprising a second gimbal arm connected to the joystick to permit rotation between the joystick and the second gimbal arm around a second axis.

20. The pointing device of claim 19 further comprising:

a second sensor having a second sensor body coupled with a second sensor shaft, the second sensor shaft being substantially immovably connected to the joystick to move with the joystick except the second sensor shaft is movable relative to the joystick in rotation around the joystick axis, the second sensor shaft being rotatable relative to the second sensor body generally around the second axis; and a second mounting mechanism provided on the second gimbal arm and being coupled to the second sensor body to permit the second sensor body to move with the second sensor shaft except in rotation around the second axis.

21. The pointing device of claim 20 further comprising a boss inserted relative to the joystick substantially only in rotation around the joystick axis, and wherein the second sensor shaft is substantially immovably connected to the boss.

22. The pointing device of claim 21 wherein the second sensor shaft is inserted into an opening in the boss with a press fit and is oriented generally along the second axis.

23. The pointing device of claim 21 wherein the second sensor includes a second protrusion connected to the second sensor body, and wherein the second mounting mechanism comprises a pair of surfaces provided on the second gimbal arm and being disposed generally laterally relative to the second axis and contacting two sides of the second protrusion to prevent rotation of the second sensor body around the second axis.

24. The pointing device of claim 23 wherein the second protrusion of the second sensor body includes a generally spherical distal end and the pair of surfaces contact the generally spherical distal end to permit movement of the second sensor body with the joystick except rotation of the second sensor body around the second axis.

* * * * *